United States Patent [19]

Chau et al.

[11] Patent Number: 5,132,042

[45] Date of Patent: Jul. 21, 1992

[54] METHOD OF MAKING LANTHANUM CERIUM TERBIUM PHOSPHATE PHOSPHOR WITH IMPROVED BRIGHTNESS

[75] Inventors: Chung N. Chau, Sayre; Anthony F. Kasenga; Charles F. Chenot, both of Towanda, all of Pa.; Leslie F. Gray, Waverly, N.Y.

[73] Assignee: GTE Products Corporation, Stamford, Conn.

[21] Appl. No.: 522,611

[22] Filed: May 14, 1990

[51] Int. Cl.$^5$ .............................................. C09K 11/81
[52] U.S. Cl. .............................................. 252/301.4 P
[58] Field of Search .................................. 252/301.4 P

[56] References Cited

U.S. PATENT DOCUMENTS

| | | | |
|---|---|---|---|
| 3,544,483 | 12/1970 | Lagos | 252/301.4 P |
| 4,127,415 | 11/1978 | Quackenbush et al. | 252/301.4 P |
| 4,423,349 | 12/1983 | Nakajima et al. | 313/487 |

FOREIGN PATENT DOCUMENTS

| | | | |
|---|---|---|---|
| 2534834 | 2/1976 | Fed. Rep. of Germany | 252/301.4 P |
| 54-56086 | 5/1979 | Japan | 252/301.4 P |
| 57-133182 | 8/1982 | Japan | 252/301.4 P |
| 59-179578 | 10/1984 | Japan | 252/301.4 P |
| 2124243 | 2/1984 | United Kingdom | 252/301.4 P |

*Primary Examiner*—Jack Cooper
*Attorney, Agent, or Firm*—Elizabeth A. Levy

[57] ABSTRACT

A method of making a lanthanum cerium terbium phosphate phosphor involves the single-step reaction of single-phase, mixed valence state lanthanum cerium terbium oxide with boron phosphate in the presence of a flux-forming compound containing lithium. The resulting phosphor is up to 5% brighter than the same phosphor prepared without the lithium-containing compound.

29 Claims, 2 Drawing Sheets

METHOD OF MAKING LANTHANUM CERIUM TERBIUM PHOSPHATE PHOSPHOR WITH IMPROVED BRIGHTNESS

TECHNICAL FIELD

This invention relates to a process for making a lanthanum cerium terbium phosphate phosphor for use in fluorescent lamps.

BACKGROUND ART

Such a phosphor is disclosed in U.S. Pat. No. 4,423,349 to Nakajima et al. In that patent, phosphor brightness is optimized by varying the proportions of lanthanum, cerium and terbium. The brightest phosphor has the composition $La_{0.2}Ce_{0.7}Tb_{0.1}PO_4$ and is made by a multiple-step synthesis.

SUMMARY OF THE INVENTION

A copending application, Ser. No. 07/522,695, filed concurrently herewith, presents a method of making a lanthanum cerium terbium phosphate phosphor in a single-step synthesis. Boron phosphate is used as the phosphate source because it is stable at elevated temperatures and can thus be used in near stoichiometric proportions in the reaction.

It has been discovered that the presence of a flux-forming compound in the reaction has a beneficial effect on the brightness of the resulting phosphor.

It is an object of the invention to provide a method of making a lanthanum cerium terbium phosphate phosphor having improved brightness.

In accordance with the invention there is provided a method of making a lanthanum cerium terbium phosphate phosphor comprising the steps of reacting single-phase, mixed valence state lanthanum cerium terbium oxide with boron phosphate in the presence of a flux-forming compound at a suitable temperature to form a mixture comprising lanthanum cerium terbium phosphate phosphor, boron oxide and dissociated ions from the flux-forming compound, and separating the phosphor from the boron oxide and dissociated ions.

BRIEF DESCRIPTION OF THE DRAWINGS

FIG. 1 shows the particle morphology at 5000× of the phosphor synthesized without lithium carbonate. FIG. 2 shows the effect on particle morphology when 0.03 mole of lithium carbonate is added to the reaction.

FIG. 3 show the particle morphology at 5000× of the phosphor synthesized without lithium carbonate. FIG. 4 shows the effect on particle morphology when 0.03 mole of lithium carbonate is added to the reaction.

BEST MODE FOR CARRYING OUT THE INVENTION

Figure 1:
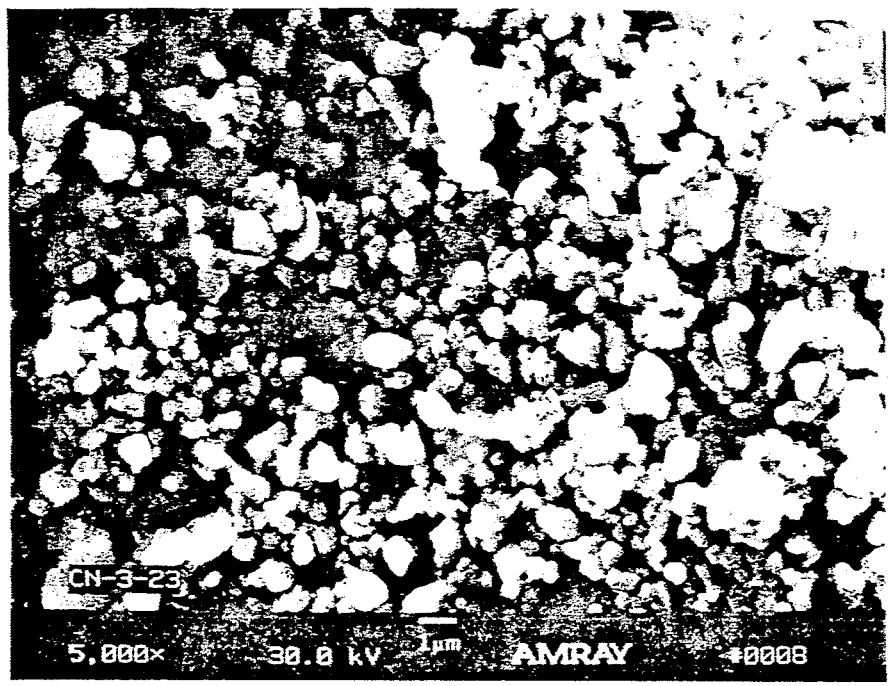
FIGS. 1 and 2 are scanning electron microscope photographs of the phosphor prepared in Example 1.
Figure 2:
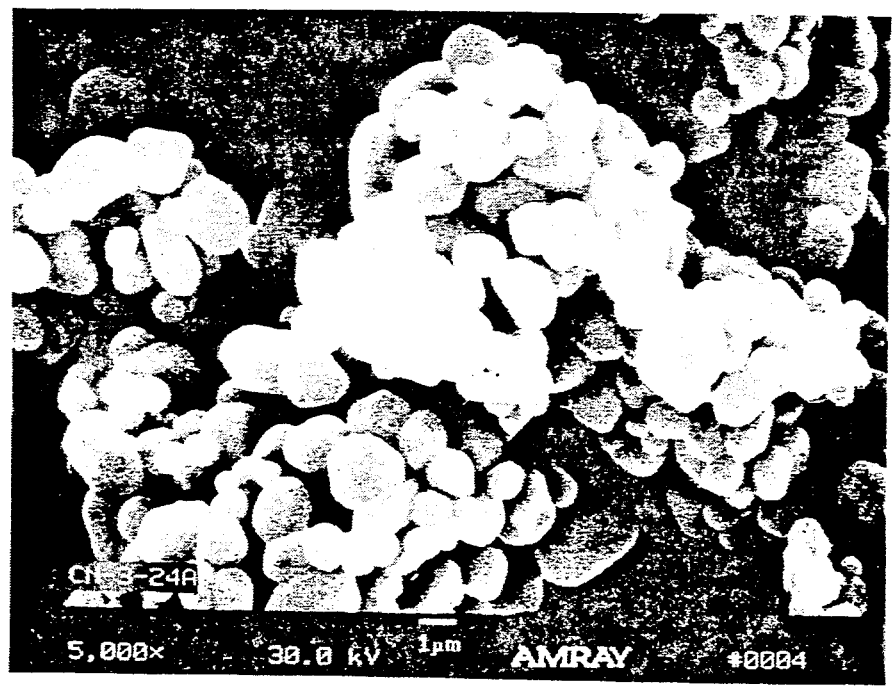
Figure 3:
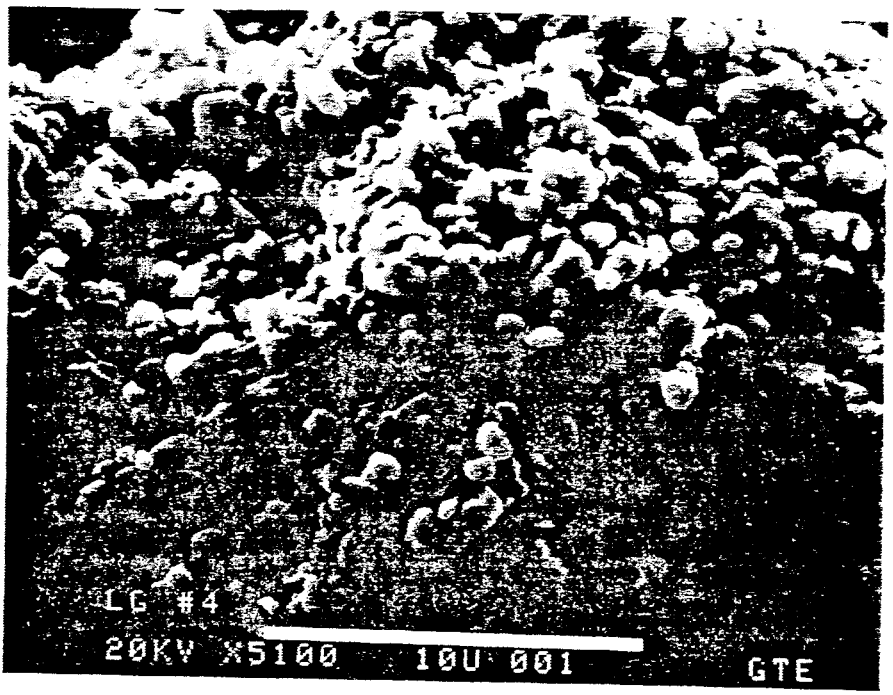
FIGS. 3 and 4 are scanning electron microscope photographs of the phosphor prepared in Example 2.
Figure 4:
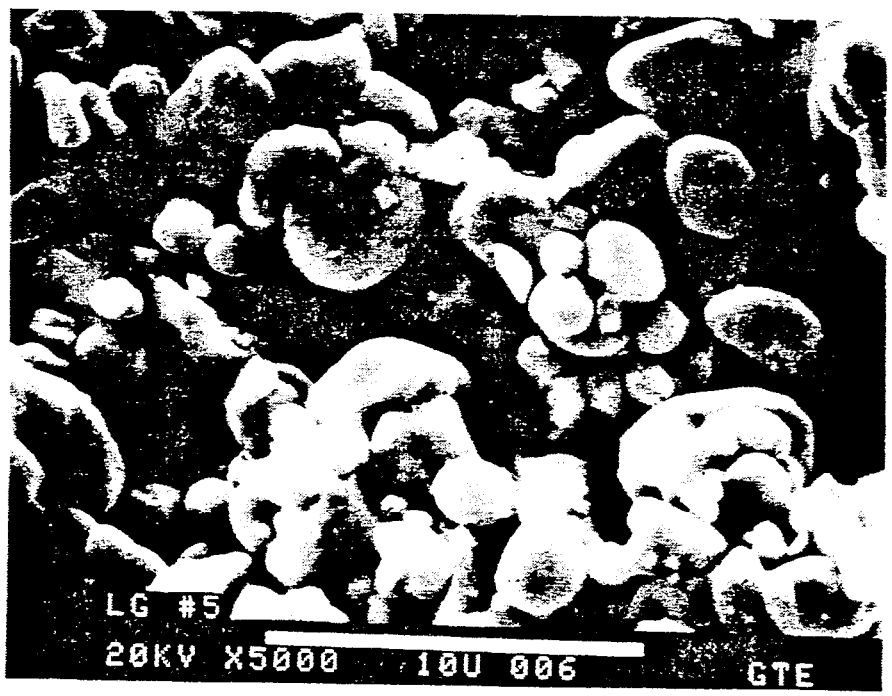

For a better understanding of the present invention, together with other and further objects, advantages and capabilities thereof, reference is made to the following disclosure and appended claims.

For optimum brightness, lanthanum cerium terbium phosphate phosphor particles should be of a substantially uniform, narrowly distributed particle size. A particle size range of about 3 to 5 micrometers, as measured by a sonified Coulter Counter method, allows maximum ultraviolet (UV) energy absorption with minimum UV scatter within a fluorescent lamp. Furthermore, optimum lamp coating densities can be obtained with reduced amounts of phosphor powder. A more efficient method of making this phosphor having these particle size characteristics would thus be advantageous.

The method of the present invention is a single-step synthesis whereby rare earth compounds are reacted with boron phosphate ($BPO_4$) in the presence of a flux-forming compound containing lithium. The rare earth compounds, such as lanthanum cerium terbium oxide or the individual oxides of lanthanum, cerium and terbium, may be combined with the boron phosphate in near stoichiometric proportions. A preferred molar ratio of the rare earth compound or compounds to the boron phosphate is from about 1:1 to about 1:1.05.

Dissociated ions from the flux-forming compound may improve the solubility of the rare earth phosphate in the boron oxide solution formed during the reaction. A preferred flux-forming compound is lithium carbonate, $Li_2CO_3$.

The rare earth raw materials may be a single phase material of lanthanum cerium terbium oxide having the composition $(La_xCe_yTb_z)_2O_3$ where $x = 0.39$ to $0.73$ and preferably from $0.42$ to $0.70$; $y = 0.17$ to $0.45$ and preferably from $0.18$ to $0.44$; and $z = 0.10$ to $0.16$ and preferably from $0.12$ to $0.14$. A preferred lanthanum cerium terbium oxide has the composition $(La_{0.446}Ce_{0.424}Tb_{0.130})_2O_3$ and is commercially available from Rhone-Poulenc, Inc. or Shin-Etsu Chemical Co., Ltd. Alternatively, the individual oxides of lanthanum, cerium and terbium may be used. Boron phosphate, while commercially available, may not be of sufficient purity to obtain the results desired in this invention. It has been found that boron phosphate of a sufficiently high purity may be prepared by heating a 1:1 mixture of boric acid ($H_3BO_3$) and diammonium phosphate $(NH_4)_2HPO_4$ at 700° C. to 1000° C. for 2 hours.

During the firing step boron phosphate reacts with lanthanum cerium terbium oxide to form a lanthanum cerium terbium phosphate phosphor in a boron oxide ($B_2O_3$) solution. A reacting time of about 1.5 to about 4 hours at a reacting temperature of about 1150° C. to about 1300° C. is desired. The boron oxide formed during the reaction acts as a mild fluxing medium to promote the reaction by facilitating crystal growth. However, boron oxide alone (i.e., without the presence of lithium ions) is a poor solvent for rare earth phosphate compounds. The result of this poor solubility is that phosphor crystals do not readily dissolve and reprecipitate in the boron oxide solution and thus do not grow. The resulting phosphor particles are small and irregular in shape.

An advantage of using boron phosphate as the phosphate source in this reaction is its capacity as a reducing agent. Cerium and terbium are present in lanthanum cerium terbium oxide as +4 valence ions. These +4 ions are reduced to the +3 valence state in the presence of boron phosphate. Prior art methods for making this phosphor require a reducing atmosphere to effect this valence state reduction. The reaction as per this invention can occur in an inert atmosphere because of the reducing properties of boron phosphate. A reducing atmosphere can also be used.

The presence of lithium ions in the reaction of lanthanum cerium terbium oxide and boron phosphate is believed to increase the solubility of rare earth phosphate compounds in boron oxide. The combination of ionic lithium and boron oxide appears to have improved fluxing capabilities over the boron oxide alone. The resulting phosphor particles are larger than those resulting when no lithium ions are present in the reaction, and they have a substantially uniform shape and size.

After firing, the phosphor is washed in basic and acidic solutions to remove any residual boron and lithium compound impurities. No further processing is required.

The presence of lithium ions in the reaction is also believed to influence the chromaticity and spectral properties of the phosphor. With respect to chromaticity, it is believed that the combination of lithium ions and boron phosphate contributes to the formation and random distribution of cerium-terbium ion pairs. Optimum green emission is obtained when cerium, a blue-emitting primary activator, absorbs UV energy from the mercury discharge excitation and transfers that absorbed energy to terbium, which does not absorb UV energy but rather emits energy as visible green light. Unless a high degree of association exists between cerium and terbium, and unless these ion pairs are highly randomly distributed within the phosphor, the resulting visible emission will have more of a blue component, with a corresponding decrease in brightness.

The excitation spectrum of the phosphor made by the method of this invention shows a perceptible increase in absorption in the longer, near-UV wavelengths (above 300 nm). Prior art methods of making this phosphor result in an excitation spectrum more confined to absorption at the 254 nm line in the mercury discharge. It is believed that the presence of lithium ions in the reaction of rare earth compounds and boron phosphate causes this excitation change by improving the mobility or diffusivity of cerium and terbium by increasing their solubility in the boron oxide medium. The result is improved brightness and greenness because of a more uniform and random dispersion of the cerium-terbium ion pairs in the phosphor. This discovery may have important implications for phosphor brightness in applications where more near-UV wavelength excitation energy is available, for example, in fluorescent lamps operating at a high current load.

The following non-limiting examples are presented.

EXAMPLE 1

The following raw materials were combined in a 10-qt plastic V-blender: 1660 grams of lanthanum cerium terbium oxide having the composition $(La_{0.446}Ce_{0.424}Tb_{0.130})_2O_3$; 1110 grams of boron phosphate, $BPO_4$; and 22.2 grams of lithium carbonate, $Li_2CO_3$. The molar ratios of the components were thus 1 mole of rare earth oxide, 1.05 moles of boron phosphate and 0.03 mole of lithium carbonate (0.06 mole of lithium ions). The raw materials were V-blended for 15 minutes and then blended for 15 minutes with an intensifying bar to form a uniform mixture. The mixture was then fired at 1200° C. for 4 hours in a 1% hydrogen/99% nitrogen atmosphere to form the phosphor. The reaction is indicated by the following equation:

$$RE(III)_xRE(IV)_{1-x}O_{2-0.5x} + (1 + y)BPO_4 \longrightarrow$$

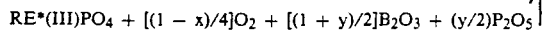

where
RE(III) is $La^{+3}$ or $Tb^{+3}$ or $Ce^{+3}$;
RE(IV) is $Ce^{+4}$ or $Tb^{+4}$;
RE*(III) is (lanthanum cerium terbium)$^{+3}$;
$0.47 \leq x \leq 1.0$; and
$0 < y \leq 0.05$.

The fired cake was broken up and washed at about 90° C. for about 4 hours in 2% dilute nitric acid, $HNO_3$. After filtration, the white body phosphor was washed and filtered three times with hot deionized water. The washed phosphor was then washed with 5% ammonium hydroxide, $NH_4OH$. After this base wash the phosphor was filtered and washed with hot deionized water. The filtered phosphor was dried at about 110° C. for about 16 hours and then sifted through a 378 nylon mesh screen.

EXAMPLE 2

The following raw materials were combined in a 10-qt plastic V-blender: 733.1 grams lanthanum oxide, $La_2O_3$; 243.0 grams terbium oxide, $Tb_4O_7$; 740.1 grams cerium oxide, $CeO_2$; 1110 grams boron phosphate, $BPO_4$; and 22.2 grams of lithium carbonate, $Li_2CO_3$. The molar ratios of the components were thus 0.450 mole of lanthanum, 0.130 mole of terbium, 0.43 mole of cerium, 1.05 moles of boron phosphate and 0.03 mole of lithium carbonate (0.06 mole of lithium ions). The blending, firing and washing conditions were the same as those of Example 1. The reaction is indicated by the following equation:

$$xRE(III)O_{1.5} + (1-x)RE(IV)O_2 + (1+y)BPO_4 \longrightarrow$$

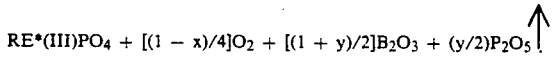

where
RE(III) is $La^{+3}$ or $Tb^{+3}$ or $Ce^{+3}$;
RE(IV) is $Ce^{+4}$ or $Tb^{+4}$;
RE*(III) is (lanthanum cerium terbium)$^{+3}$;
$0.47 \leq x \leq 1.0$; and
$0 < y \leq 0.05$.

Table I shows the effect of the addition of lithium carbonate to the phosphor of Example 1 with respect to brightness in plaque test measurements. At 0.02 mole of lithium carbonate per mole of lanthanum cerium terbium phosphate phosphor, a 5.0% increase in brightness was obtained. A beneficial effect on phosphor brightness was obtained by providing up to 0.12 mole of lithium ions per mole of lanthanum cerium terbium phosphate phosphor, with the preferred amount of lithium ions being between 0.04 and 0.06 mole per mole of lanthanum cerium terbium phosphate phosphor.

Table II shows the effect of the addition of lithium carbonate to the phosphors of Examples 1 and 2 with respect to particle size, brightness and maintenance in fluorescent lamps. The control phosphor is a commercially available lanthanum cerium terbium phosphate phosphor. Initial brightness and maintenance values in Example 1 are slightly higher than those of the control. Significant improvements were seen in the phosphor of Example 2 over the same phosphor without the addition of lithium carbonate. Maintenance of the phosphor of Example 1 was also slightly improved by the addition of lithium carbonate.

TABLE I

EFFECT OF LITHIUM CARBONATE ON THE PHOSPHOR OF EXAMPLE 1

| FLUX | | RELATIVE PLAQUE BRIGHTNESS | IMPROVEMENT |
|---|---|---|---|
| $Li_2CO_3$ | 0 mole | 99.8% | — |
| | 0.01 mole | 101.1% | 1.3% |
| | 0.02 mole | 104.8% | 5.0% |
| | 0.03 mole | 103.8% | 4.0% |
| | 0.06 mole | 104.2% | 4.4% |

TABLE II

EFFECT OF LITHIUM CARBONATE ON PARTICLE SIZE, BRIGHTNESS AND MAINTENANCE IN STANDARD LOAD 40T12 LAMPS

| | 50% SIZE | 0 HR | 100 HR | MAINT |
|---|---|---|---|---|
| CONTROL | 3.92 | 4858 L | 4677 L | 96.3% |
| EXAMPLE 1 | 5.05 | 4878 L | 4762 L | 97.6% |
| EXAMPLE 1, NO LITHIUM | 4.09 | 4103 L | 3957 L | 96.4% |
| EXAMPLE 2 | 5.95 | 4027 L | 3784 L | 94.0% |
| EXAMPLE 2, NO LITHIUM | 5.09 | 3178 L | 2991 L | 94.1% |

While there has been shown and described what are at present considered the preferred embodiments of the invention, it will be obvious to those skilled in the art that various changes and modifications may be make therein without departing from the scope of the invention as defined by the appended claims.

What is claimed is:

1. A method of making lanthanum cerium terbium phosphate phosphor having improved brightness, comprising the steps of:
   a) reacting single-phase lanthanum cerium terbium oxide with boron phosphate in the presence of a flux-forming compound containing lithium at about 1150° C. to about 1300° C. in an inert or reducing atmosphere to form a mixture comprising lanthanum cerium terbium phosphate phosphor, boron oxide and dissociated ions from said flux-forming compound containing lithium; and
   b) separating said lanthanum cerium terbium phosphate phosphor from said boron oxide and said dissociated ions.

2. The method of claim 1 wherein said lanthanum cerium terbium oxide and said boron phosphate are provided in near stoichiometric proportions.

3. The method of claim 2 wherein said lanthanum cerium terbium oxide and said boron phosphate are provided in a molar ratio of from about 1:1 to about 1:1.05.

4. The method of claim 1 wherein said dissociated ions comprise lithium ions.

5. The method of claim 1 wherein said flux-forming compound is lithium carbonate.

6. The method of claim 5 wherein said lithium carbonate is provided in an amount of up to 0.12 mole of lithium ions per mole of lanthanum cerium terbium phosphate phosphor.

7. The method of claim 5 wherein said lithium carbonate is provided in an amount of 0.04 to 0.06 mole of lithium ions per mole of lanthanum cerium terbium phosphate phosphor.

8. The method of claim 1 wherein said reaction step occurs for about 1.5 to about 4 hours.

9. The method of claim 8 wherein said reaction step occurs at about 1200° C. for about 4 hours.

10. The method of claim 8 wherein said reaction step occurs in an inert atmosphere.

11. The method of claim 8 wherein said reaction step occurs in a reducing atmosphere.

12. The method of claim 1 wherein said separation step is performed by washing.

13. The method of claim 12 wherein said washing step is performed in acidic and basic solutions.

14. The method of claim 13 wherein said acidic solution is dilute nitric acid.

15. The method of claim 13 wherein said basic solution is dilute ammonium hydroxide.

16. A method of making lanthanum cerium terbium phosphate phosphor having improved brightness, comprising the steps of:
   a) reacting lanthanum oxide, cerium oxide and terbium oxide with boron phosphate in the presence of a flux-forming compound containing lithium at about 1150° C. to about 1300° C. in an inert or reducing atmosphere to form a mixture comprising lanthanum cerium terbium phosphate phosphor, boron oxide and dissociated ions from said flux-forming compound containing lithium; and
   b) separating said lanthanum cerium terbium phosphate phosphor from said boron oxide and said dissociated ions.

17. The method of claim 16 wherein said lanthanum oxide, said cerium oxide, said terbium oxide and said boron phosphate are provided in near stoichiometric proportions.

18. The method of claim 16 wherein said dissociated ions comprise lithium ions.

19. The method of claim 16 wherein said flux-forming compound is lithium carbonate.

20. The method of claim 19 wherein said lithium carbonate is provided in an amount of up to 0.12 mole of lithium ions per mole of lanthanum cerium terbium phosphate phosphor.

21. The method of claim 19 wherein said lithium carbonate is provided in an amount of 0.04 to 0.06 mole of lithium ions per mole of lanthanum cerium terbium phosphate phosphor.

22. The method of claim 16 wherein said reaction step occurs for about 1.5 to about 4 hours.

23. The method of claim 22 wherein said reaction step occurs at about 1200° C. for about 4 hours.

24. The method of claim 22 wherein said reaction step occurs in an inert atmosphere.

25. The method of claim 22 wherein said reaction step occurs in a reducing atmosphere.

26. The method of claim 16 wherein said separation step is performed by washing.

27. The method of claim 26 wherein said washing is performed in acidic and basic solutions.

28. The method of claim 27 wherein said acidic solution is dilute nitric acid.

29. The method of claim 27 wherein said basic solution is dilute ammonium hydroxide.

* * * * *